Oct. 30, 1951    L. A. VANDERLIP    2,573,627
AUTOMOTIVE HEADLIGHT DIMMING SYSTEM
Filed Oct. 24, 1949
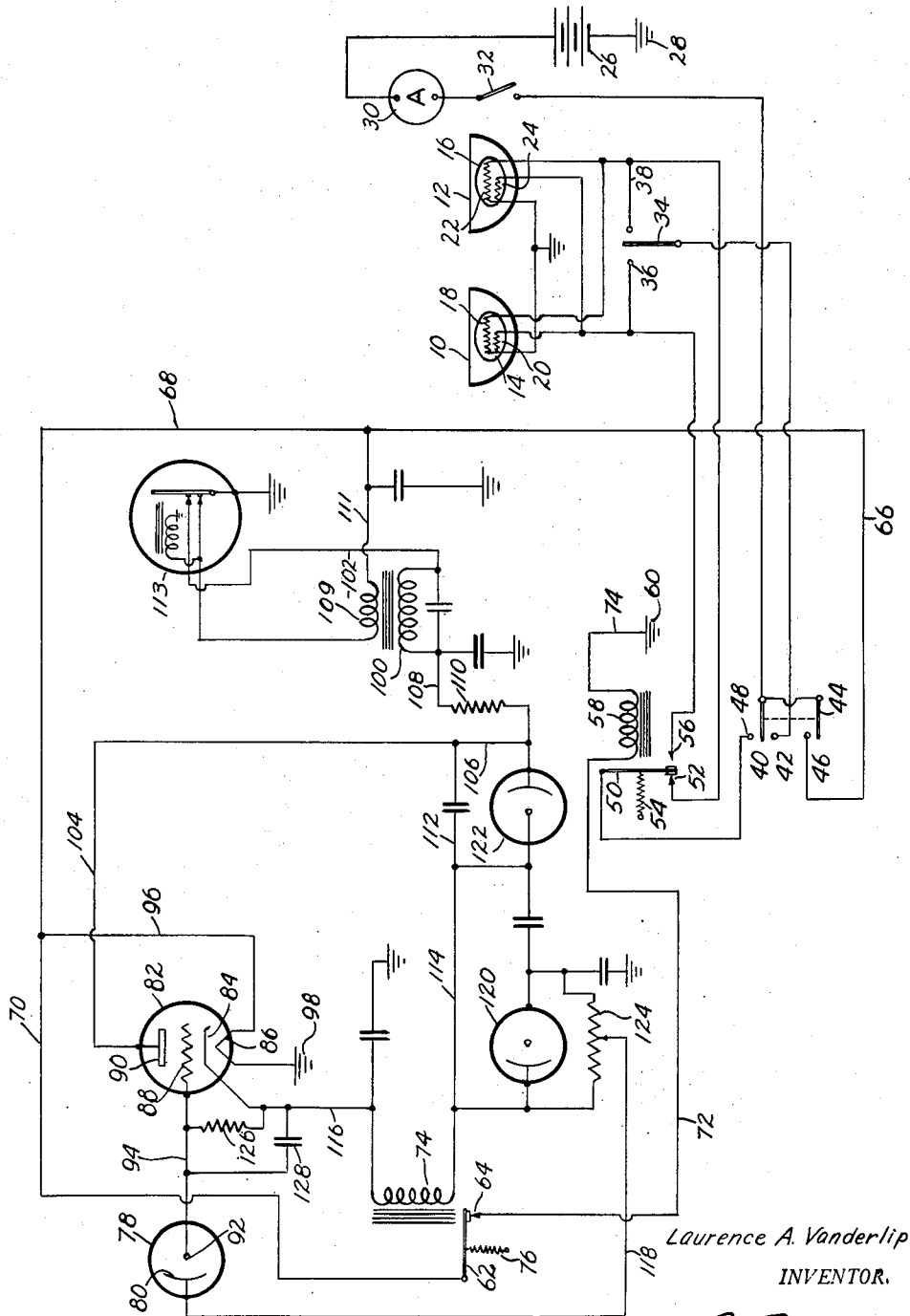
Laurence A. Vanderlip
INVENTOR.
BY
ATTORNEY Patented Oct. 30, 1951

2,573,627

UNITED STATES PATENT OFFICE 2,573,627

AUTOMOTIVE HEADLIGHT DIMMING SYSTEM

Laurence A. Vanderlip, Wichita, Kans.

Application October 24, 1949, Serial No. 123,221

1 Claim. (Cl. 315—83)

This invention relates to a control system, particularly adapted for use with automobiles, and operable automatically to dim the headlights thereof upon approach of another lighted vehicle, and to restore the headlights to a bright condition immediately after passing, all without operator attention of any kind.

The primary object of this invention is to provide an automatic headlight control that is easily and simply installed and coupled with existing automobile electric circuits without substantial variation and without affecting adversely the operation thereof in any manner.

The most important object of the present invention is to provide a control that can be installed, and subsequently be selectively placed in use or rendered inoperable by the operator by the mere manipulation of a switch arm or button, which operator action also renders the existing manual dimming apparatus of the automobile inoperable while the control hereof functions.

Another important object is to provide a photoelectric control that is highly sensitive to rays of light and provided with minute adjusting means, making it possible for the user to determine the intensity of light necessary to render the dimming operation operable.

Other objects include the way a control vacuum tube is utilized to normally maintain an electric make and break mechanism open, the way in which current flow in the tube controls said mechanism; the manner of coupling a photoelectric cell with the tube to control the same depending on variance in light rays falling on the tube; and the manner of maintaining a constant voltage on the cell and the control tube regardless of load variation and other factors effecting the current source.

More minor objects will be made clear or become apparent as the following specification proceeds, reference being had to the accompanying drawing, wherein the single figure is a schematic wiring diagram showing an automobile headlight dimming system made in accordance with my present invention.

A pair of automobile headlights 10 and 12 are provided with incandescent lamps 14 and 16 respectively. Lamp 14 is provided with a bright filament 18 and a dim filament 20; likewise lamp 16 has a bright filament 22 and a dim filament 24. A battery 26 grounded at 28 supplies electrical energy for lamps 14 and 16 through an ammeter 30 and a main switch 32.

A manual switch 34 couples bright filaments 18 and 22 with battery 26 when closed with respect to contact 36 and couples dim filaments 20 and 24 with battery 26 when closed with contact 38. This operation takes place only when switch 32 is closed and when a switch 40 interposed between switches 32 and 34 is in engagement with a fixed contact 42.

Battery 28 supplies electrical energy to the automatic control forming the subject matter of this invention when a switch 44 (ganged with switch 40 for manual operation therewith) is closed with respect to a stationary contact 46. When switch 44 is in such position, switch 40 is in a closed relationship with a contact 48, rendering switch 34 ineffectual.

A switch arm 50, normally held biased against a contact 52 by a spring 54, is connected with the battery 26 when the switch 40 and the contact point 48 are interengaged. Contact point 52 is coupled directly with bright filaments 18 and 22 while an opposed stationary contact point 56 is in connection with dim filaments 20 and 24.

A relay 58 grounded at 60, is disposed relative to metallic switch arm 50 to attract the latter upon energization of relay 58, thereby deenergizing bright filaments 18 and 22 and energizing dim filaments 20 and 24 (provided switch 32 is closed and switches 40 and 44 are closed with contacts 48 and 46 respectively), because of movement of arm 50 against the action of spring 54 from contact 52 to contact 56. Energization of relay 58 to automatically dim headlights 10 and 12, takes place upon movement of a contact arm 62 from the normally open position shown to a closed position in engagement with a stationary contact 64. This closes the following circuit through relay 58, energizing the coil thereof and attracting arm 50 toward contact 56.

From battery 26, through ammeter 30, closed switch 32, switch arm 44, contact 46, wires 66, 68 and 70, switch arm 62, contact 64, wire 72, relay 58, and wire 74 to ground 60.

The contact arm 62 is normally held out of engagement with the stationary contact 64 by a relay 74 that operates when energized, to attract arm 62 against a spring 76.

In order to convert light waves or energy, emanating from an approaching automobile, into electrical current or energy, there is provided a photoelectric tube 78. The circuit for energizing the relay 74 is controlled by the intensity of light entering the tube 78 and falling upon a light sensitive element or cathode 80, forming a part of tube 78, through use of suitable photoelectric materials in the usual manner.

A triode vacuum tube 82, provided with a cathode 84 having a filament 86, a control grid 88, and a plate or anode 90, has its grid 88 coupled directly with anode 92 of photoelectric tube 78 by a wire 94. Obviously, the operation of tube 82 depends upon the number of photoelectrons discharged by tube 78, and similarly, the emission of electrons by tube 78 is dependent upon the intensity of light falling upon cathode 80. The brighter the light entering tube 78, the greater the current output thereof.

Heating of filament 86 of tube 82 is by direct current through the following circuit:

From battery 26, through ammeter 30, closed switch 32, switch arm 44, contact 46, wires 66, 68 and 96, and filament 86 to ground 98.

Plate 90 of tube 82 is positively charged by connection with one side of the secondary 100 of a power transformer 102 through lines 104, 106 and 108, there being a resistor 110 coupled in this circuit to operate as a voltage compensator.

Transformer 102 receives energy from battery 26 through a direct connection with one side of its primary 109 by line 111 with wire 66. A transformer type vibrator 113 of conventional character, connects with the opposite sides of windings 100 and 109.

It is seen therefore, that relay 74 operates in response to the plate circuit of tube 82 since one side of its coil is connected with wire 104 of plate 90 through wires 112 and 114 and the other side of its coil has connection with cathode 84 of tube 82 by wire 116. Thus with a predetermined plate current flow, relay 74 will normally remain energized to hold arm 62 in the open position shown against the bias of spring 76.

Accordingly, since a variance in voltages fed into grid 88, controls the current flowing in the plate circuit of tube 82, variance in the photoelectron emission of anode 92 will control relay 74.

Tube 78 receives energy from secondary 100 of transformer 102 to which it is connected by a circuit including a wire 118 joined with its light sensitive cathode 80.

The voltages supplied to tubes 78 and 82 are maintained constant regardless of each variation, and are thereby controlled and fed proper operating voltages by a pair of voltage regulator tubes 120 and 122 respectively, and the voltages applied to tube 78 is additionally controlled by a manually operable, variable resistor 124, all interposed within the supply line 108 of secondary 100.

Consequently, with the proper selection of tubes 120 and 122, and selected setting of resistor 124, tube 82 can be caused to normally operate, as above set forth, in maintaining relay 74 energized. The grid return 94 for tube 82 is connected with cathode 84 in the usual manner through a bias resistor 126 and a by-pass condenser 128.

Accordingly, during normal operation, tube 122 will permit tube 82 to be supplied with sufficient voltages to maintain relay 74 energized. The plate current of tube 82 will not be effected by the negative charge on grid 88 to the extent of preventing sufficient current flow in the plate circuit of tube 82 for supplying relay 74 with enough energy to overcome the tension of spring 76.

However, tube 120 will supply tube 78 with sufficient energy to increase the negative charge on grid 88 when an outside light source falls on cathode 80 and the intensity of such light necessary to overcome spring 76 will depend on the position of resistance 124. In other words, by precise adjustment of resistor 124, the user can predetermine with minute accuracy the intensity of light necessary to cause closing of relay 74.

Obviously, the sensitivity control resistance 124 should be set to cause a strong negative bias on grid 88 when exceptionally bright light rays are directed to tube 78, and to also assure that the increase in output of tube 78, in case of dim lights, will not be sufficient to cause closing of switch arm 62.

It is seen therefore, that when tube 78 is placed on an automobile where its cathode 80 will intercept rays of light from another oncoming automobile, dim filaments 20 and 24 will become automatically energized in lieu of bright filaments 18 and 22.

If, under test, it is determined that the circuit is too sensitive, responding to approaching automobiles at a long distance, then resistance 124 can be adjusted to require light of greater intensity to decrease the plate current of tube 82. These adjustments can also be made when bright moonlight, street lights or stop lights effect the control in an undesirable manner. And, if desired, means could be provided to shade tube 78 in a manner to prevent rays of light emanating from the sides, above or below tube 78 from effecting the same to any appreciable extent.

While I have shown and described a particular embodiment of the invention, it will be apparent to those skilled in the art that numerous modifications and variations thereof may be made without departing from the underlying principles of the invention. I, therefore, desire, by the following claim, to include within the scope of my invention, all such modifications and variations by which substantially the results of the invention may be obtained by the use of the same or equivalent means.

Having thus described my invention, what I claim as new and desire to secure by Letters Patent is:

In a lighting system, a dim circuit and a bright circuit; a first switch common to said circuits and movable to and from positions alternately closing the same; a source of electrical energy; a relay having make and break mechanism; a second switch movable to and from positions alternately coupling said first switch and said mechanism with said source, said mechanism normally closing said bright circuit when coupled with said source, said relay having a coil for moving said mechanism to a position opening the bright circuit and closing said dim circuit when said coil is energized; an operating circuit for the coil; an electronic tube having a control grid and an anode-cathode circuit; a second relay having an operating coil in said anode-cathode circuit and a switch in said operating circuit; voltage control means in said anode-cathode circuit for maintaining said operating coil energized to hold said switch normally open; electrical apparatus coupled with said control grid for receiving and converting rays of light into electrical energy; a circuit for said apparatus; means in said last mentioned circuit for normally controlling the voltage from said apparatus to said control grid; a variable resistor in said last mentioned circuit for controlling the emission of electrons by said apparatus whereby to deenergize said anode-cathode circuit only upon light of predetermined intensity passing to said apparatus; and a third switch ganged for movement with said second switch to a position for coupling said source with the operating circuit, the anode-cathode circuit and the circuit for said apparatus when the second switch is moved to a position coupling said mechanism with the source of energy.

LAURENCE A. VANDERLIP.

REFERENCES CITED

The following references are of record in the file of this patent:

UNITED STATES PATENTS

| Number | Name | Date |
|---|---|---|
| 2,150,900 | Alley | Mar. 21, 1939 |
| 2,219,976 | Berg, Jr. | Oct. 29, 1940 |
| 2,380,486 | Willis | July 31, 1945 |
| 2,431,394 | Friedman | Nov. 25, 1947 |
| 2,476,389 | Schmidt, Jr. | July 19, 1949 |
| 2,493,307 | Moore et al. | Jan. 3, 1950 |